A. WIGGIN.
CARBURETER.

No. 171,751.  Patented Jan. 4, 1876.

2 Sheets—Sheet 2.

Witnesses.
Geo. T. Smallwood Jr.
John V. Robey Jr.

Inventor.
Andrew Wiggin
By John J. Halsted
his Atty.

UNITED STATES PATENT OFFICE.

ANDREW WIGGIN, OF BOSTON, MASSACHUSETTS.

IMPROVEMENT IN CARBURETERS.

Specification forming part of Letters Patent No. 171,751, dated January 4, 1876; application filed November 15, 1875.

*To all whom it may concern:*

Be it known that I, ANDREW WIGGIN, of the city of Boston, in the State of Massachusetts, have invented certain Improvements in Carbureters; and I do hereby declare that the following, taken in connection with the drawings which accompany and form part of this specification, is a description of my invention sufficient to enable those skilled in the art to practice it.

The object of my invention is to accelerate and increase the vaporization of the fluid during the passage of the gas through the carbureter; and it consists in the method and means hereinafter described for effecting this end.

A is an ordinary vessel for containing the gasoline or other hydrocarbon or equivalent material, and it may be provided, as customary, with an appropriate inlet-tube, B, and with a flexible or jointed tube, C, for the admission of street or other gas or air, and an outlet-tube, D, for the exit of the carbureted gas or air, these tubes having appropriate cocks. It has also a cock or inlet, E, through which a liquid may be supplied, and which may also serve as a vent. It may also, if desired, have an indicator to signalize when the vessel is sufficiently filled.

The parts thus far named, not being my invention, need not be further described, and I will now proceed to describe my novel devices and their operation, and which appertain mainly to the floating gas-chamber F, with which the lower end of the flexible or jointed tube C connects.

This gas-chamber I construct in a peculiar manner, with especial reference to insuring the exposure to the gas of a larger surface than heretofore of the saturated absorbent, and to the insuring of a long and winding passage to the gas, during all of which passage it is being brought into contact with the liquid and with this increased surface of the absorbent.

Figure 1:
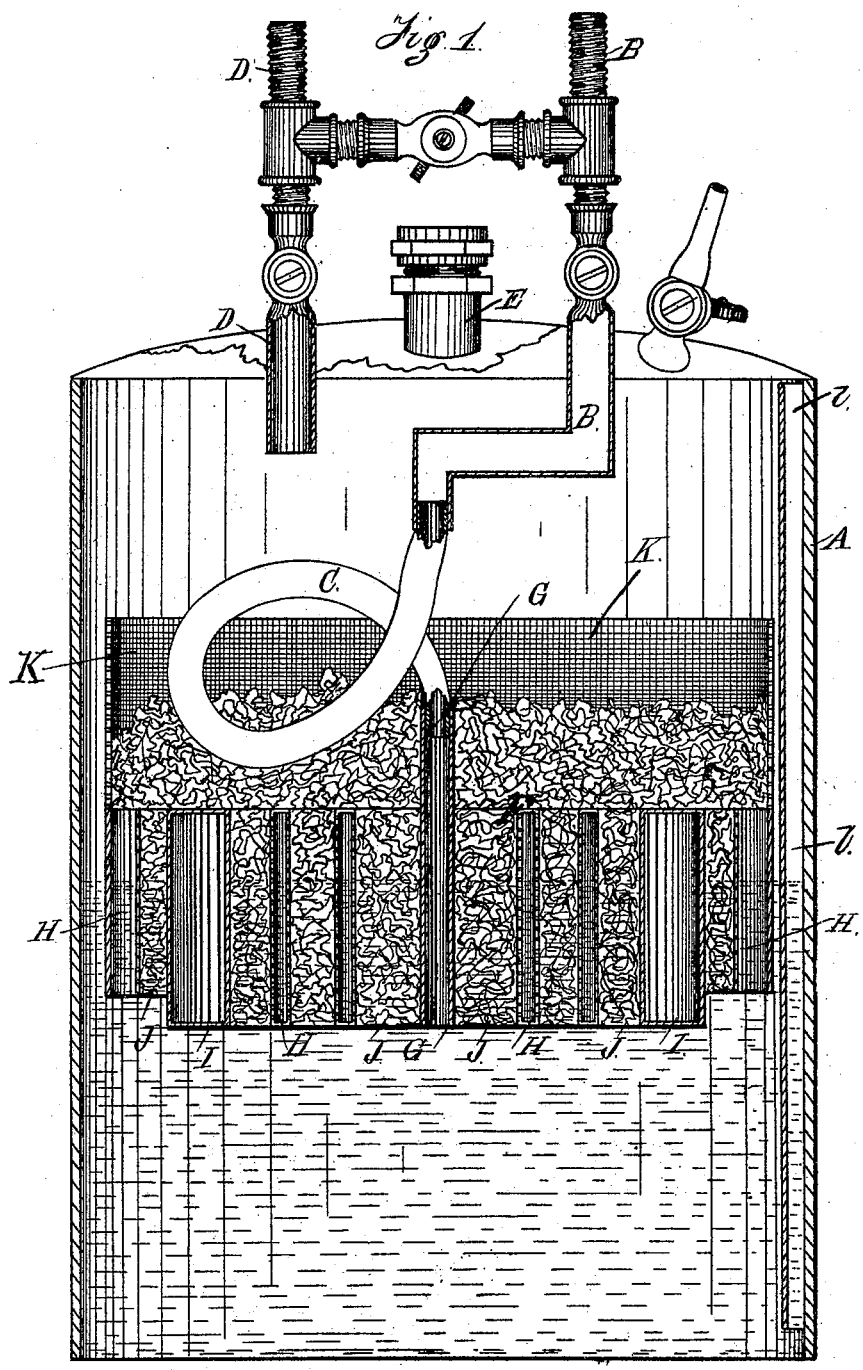
Figure 2:
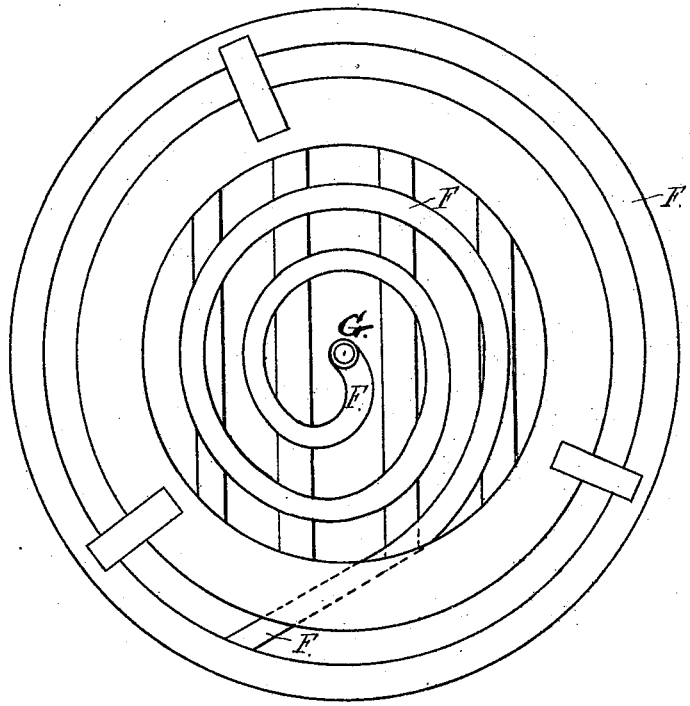

Figure 1 is a vertical section of a carbureter illustrating my invention; Fig. 2, a plan of the floating chamber or conveyer.

Figure 3:
Figure 4:
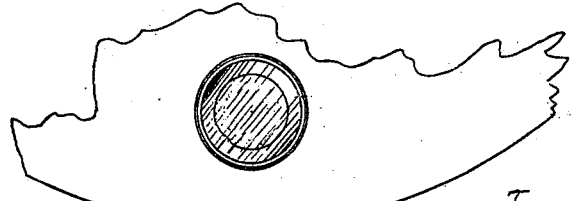

The flexible tube C connects directly to a short vertical metallic tube, G, which forms the central or starting point for the horizontal circuitous course or route of the incoming gas in its distribution. This tube G, which rises higher than the absorbent material hereinafter named, communicates by an opening at its vertical side with a winding or spiral gas or air conveyer or distributer, H, having perforations in its vertical sides for the proper exit of the gas throughout its whole length, the conveyer H being narrow in its horizontal cross-section, and relatively much broader in its vertical section, such construction permitting it to be of great length, and consequently to present a correspondingly large surface in proportion to the diameter or dimensions of the vessel A. The conveyer, at its outer wind or coil, terminates in a large circle, of a size somewhat less than the diameter of the vessel, thus carrying the gas from center to circumference as well as through the lengthy winding route. To buoy this distributer, which should be partially immersed in the liquid, an annular air-containing float, I, is connected, as shown, to the winding distributer, the latter preferably passing directly through it, in order to permit the outer ring of the distributer to be outermost. The buoyancy should be such as to permit the distributer to be only partly immersed in the liquid. It is evident that the float or buoy may be of any desired form, and connected with the distributer in any suitable manner. Between the winds or coils of the distributer H are spaces J for the reception of sawdust, sponge, or any appropriate absorbent, and such absorbent should also be placed above the distributer to any suitable height. The top or cover may have a glass-covered opening provided, by means of which the quantity of liquid introduced may be ascertained by inspection. This glass should be inserted in a removable cap, which may be screwed on and off. (See sectional Fig. 4.) It will, of course, be understood that the floating distributer will rise and fall with the liquid as it may be supplied or consumed, the flexible tube permitting such movement, and its outer ring or coil need not be perforated, as there will not be any absorbent on its exterior face—*i. e.*, between it and the wall of the vessel. A cylindrical reticulated or perforated rim, K, extends upward from the outer ring to hold any desired quantity of absorbent upon and above the distributer. I prefer that the perforations in the sides of the distributer should gradually increase in size or in number, (or in both, if desired,) in proportion to their distance from the center, so that those which are nearest the center of the coil shall permit but a small proportionate quantity of the gas to be ejected through them, and so that it shall continue to be ejected and distributed throughout its whole length with approximate uniformity proportionate to the increasing surface circumscribed by the successive coils of the distributer. Fig. 3 shows projected upon a plane one of the sides of a distributer thus perforated.

It will now be seen that as the gas makes its lateral exit through the perforations it passes directly into the thin body of saturated absorbent lying between two adjacent coils or windings of the distributer, and throughout its greatly-extended length, and into both sides of such thin body, thus becoming carbureted thoroughly without opportunity to escape upward before becoming properly charged, and that the large extent of the vertical body of saturated material allows of a proportionately large surface for vaporization of the hydrocarbon, and that by means of the increased surface of the perforated walls, and of the absorbent covering the same, the number of capillary pores brought into action will be greatly increased. The body of the absorbent, which is above the coil, being also saturated with the liquid, serves throughout its whole mass still further to charge with vapor the ascending gas or air. The coil may rest on cross-strips or on a perforated bottom.

If desired, the vessel A may have an inner perforated lining, and the space between them may be filled with an absorbent, and I provide it with a tube or passage, $l$, open at its bottom, and designed for connection at its top with the filling cock or inlet F.

I claim—

1. In combination with the float of a carbureter, a spiral or winding gas or air receiving and distributing chamber, having perforated vertical sides, substantially as shown and described.

2. In combination with the floating convolute pipe or chamber F, having its vertical sides perforated, a winding or spirally-arranged body of absorbent material placed between the coils of such distributer, carried by and rising and falling with the floating chamber, substantially as and for the purpose described.

3. In a carbureter, a winding or spiral conveyer and distributer for the air or gas, having side perforations disposed in an increasing or graduated series, substantially as and for the purpose set forth.

ANDREW WIGGIN.

Witnesses:
JOHN ROBEY, Jr.,
GEO. T. SMALLWOOD, Jr.